April 23, 1968 R. B. WALLACE 3,378,912
METHOD OF FORMING RECESSES IN PARTS FOR THE
RECEPTION OF FRICTION LOCKING PLUGS
Filed Feb. 28, 1966

INVENTOR.
RICHARD B. WALLACE
BY Whittemore,
Hulbert & Belknap
ATTORNEYS

United States Patent Office 3,378,912
Patented Apr. 23, 1968

3,378,912
METHOD OF FORMING RECESSES IN PARTS FOR THE RECEPTION OF FRICTION LOCKING PLUGS
Richard B. Wallace, Bloomfield Hills, Mich., assignor to The Oakland Corporation, Troy, Mich., a corporation of Michigan
Filed Feb. 28, 1966, Ser. No. 530,728
9 Claims. (Cl. 29—419)

The present invention relates to a method of forming recesses in parts for the reception of friction locking plugs.

It is an object of the present invention to form recesses in previously threaded parts of the character described, characterized in substantial freedom from burrs.

It is a further object of the present invention to provide recesses in threaded parts which need not be of circular cross-section but which are characterized by wall portions composed of straight line elements parallel to the depthwise axis of the recess.

The foregoing objects are realized by a method in which the recess is initially formed by an operation leaving burrs at the intersection between a side wall of the recess and the threaded surface of the part, followed by a shearing operation carried out progressively from the threaded surface of the part into the recess, the shearing operation being carried out by a tool in the form of a punch so that the sheared wall portions are composed entirely of straight line elements parallel to the depthwise axis of the recess.

It is a further object of the present invention to provide a method for forming recesses in a previously threaded part which has a non-circular cross-sectional shape.

It is a further object of the present invention to provide a method which permits the use of a controlled laser beam for initially forming a slightly inwardly tapered recess, followed by a shearing operation to form the side wall of the recess or desired portions thereof to be composed entirely of straight line elements parallel to the depthwise longitudinal axis of the recess.

Other objects and features of the invention will become apparent as the description proceeds, especially when taken in conjunction with the accompanying drawing, illustrating preferred embodiments of the invention, wherein.

The provision of friction locking elements formed of suitable friction material such for example as nylon, is well known in industry. These friction elements have been applied in recesses provided in threaded parts such as bolts or screws, or in some cases to internally threaded parts such as nuts. They have also been applied to unthreaded elements such as pins, plugs, sleeves or the like. However, the most widespread usage of these friction elements has been in threaded parts and these have been chosen for illustrating the present invention, which however, is not limited thereto.

A common practice in the past has been to form recesses of generally cylindrical cross-section extending radially into a threaded part such as a bolt or screw by a conventional drilling operation in which the drill bit is supported in a guide bushing, the end of which is directly adjacent the surface of the threaded part. This has two results. In the first place the conventional drill has a tapered point so that the recess formed thereby has a conical bottom wall. Secondly, the drilling operation inherently results in some burrs at the intersection between the interior side wall of the recess and the outer threaded surface of the part. These burrs are undesirable in any application and in some critical applications, cannot be tolerated. They are removable to a considerable degree by subsequent treatment such as suitable brushing, but this does not eliminate the possibility of some burrs remaining.

After the recess has been suitably formed as described above, a cylindrical plug of suitable material such as nylon, is pressed into the recess. Best results are obtained when the plug is applied with sufficient pressure to cause permanent deformation and elimination of plastic memory so that the bottom of the plug conforms to the conically tapered wall of the recess and the top of the plug projects at least into the thread spaces of the part to be engaged by threads on a mating part.

Figure 1:
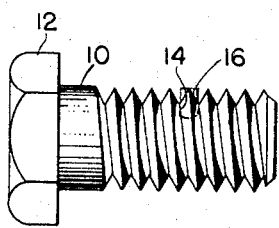
FIGURE 1 is a side view of a threaded body having a friction element provided thereon.
Figure 2:
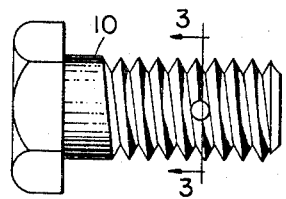
FIGURE 2 is a side elevation of the threaded body shown in FIGURE 1, turned through 90 degrees.
Figure 3:
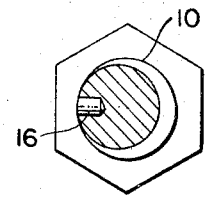
FIGURE 3 is a sectional view on the line 3—3, FIGURE 2.

In FIGURE 1 there is illustrated a bolt 10 having a head 12 and provided with a cylindrical recess 14 in which a suitable friction plug 16 has been compressed. The plug 16 remains in a comparatively secure frictional interlock with the side walls of the recess since these side walls are cylindrical and since the friction plug has been inserted under substantial pressure.

Figure 4:
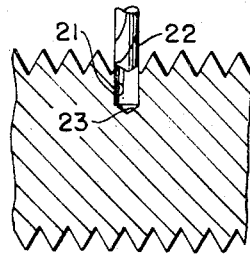
FIGURE 4 is a longitudinal section through a threaded body illustrating the relationship between a drill and the recess formed thereby.
Figure 5:
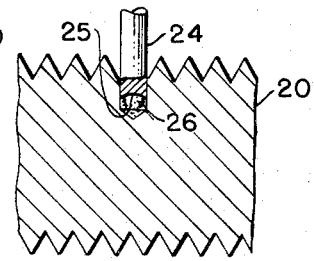
FIGURE 5 is a longitudinal sectional view showing shearing of the side wall of the recess by a punch.
Figure 6:
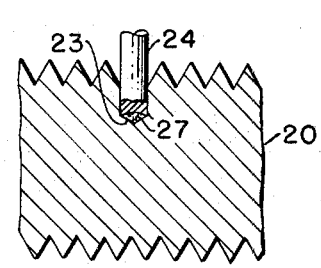
FIGURE 6 is a view similar to FIGURE 5 showing the punch at the limit of its stroke.

The improvement constituting one aspect of the present invention is illustrated in FIGURES 4–6 in which a portion of a threaded body 20 is shown as being provided with a recess 21 of generally cylindrical cross-section by a conventional drill 22. Since the drill 22 is provided with a tapered point the recess 21 includes a correspondingly conically tapered bottom wall 23. The drilling operation is initiated in a threaded surface and partly due to this circumstance, burrs remain at the intersection between the side wall of the recess 21 and the threaded surface of the body 20. These burrs are eliminated by the succeeding step in the present method, which is illustrated in FIGURE 5. Here, a punch 24 is illustrated as moving downwardly into the recess 21. In the simple case the punch 24 is of circular cross-section and has its end surface 25 either perpendicular to its length or slightly dished as illustrated, to provide a continuous shearing edge. The punch 24 has a diameter just slightly larger than the diameter of the recess 21 so that a shearing action results from movement of the punch in the recess.

Due to the shape of the threads at the outer surface of the part 20, this shearing action initiates at the crests of a thread or threads, and progresses smoothly down the thread from the crest to the root, taking a progressively wider chip from the end of the thread portion as the shearing action progresses. This action is particularly well adapted to remove any burrs present at the outer edge of the recess.

The punch 24, as illustrated in FIGURE 6, is moved inwardly until its bottom shearing edge reaches or substantially reaches the intersection between the side wall of the recess 21 and the bottom tapered wall 23 thereof. During downward movement of the punch or shearing tool the chips which are removed from the side walls of the recess are not separated from the material of the part but are mechanically formed downwardly as they are produced by the end surface of the punch. This operation is best illustrated in FIGURE 5 where the chips or shavings 26 are illustrated during an intermediate phase of the shearing operation. When the punch releases the full depth position illustrated in FIGURE 6, the chips which have been formed by the operation are compacted as illustrated at 27 in the bottom of the recess. Preferably, the sheared chips, or most of them, at this time remain unsevered and connected to the material of the part 20. The retention of these chips or shavings in the bottom of the hole does not in any way interfere with the insertion of the plastic friction element which, being inserted under relatively great pressure, further compacts the chips or shavings and of course insures that they remain permanently in the bottom of the recess. To some degree there is a commingling of the material of the friction element with the compacted chips or shavings which facilitates retention of the friction element in the recess.

Figure 7:
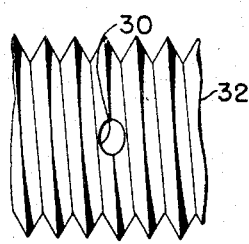
FIGURES 7–9 are fragmentary elevational views illustrating different cross-sectional shapes of recesses made feasible by the shearing operation.

Since the shearing operation which removes the burrs inherently provided by the drilling operation is performed by a punch or by a tool substantially similar to a punch, the possibility is presented of modifying the cross-sectional shape of the recess. Thus, as shown in FIGURE 7, a recess 30 of generally oval cross-sectional shape is provided in the part 32. It will be appreciated that for complete removal of burrs the minor diameter of the cross-sectional shape should exceed the diameter of the drilled hole by a small amount.

Figure 8:
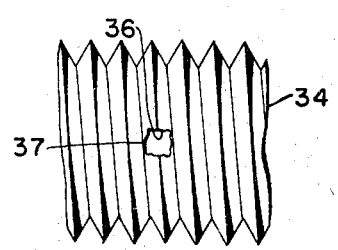

In FIGURE 8 the part 34 is shown as provided with a recess 36 having sheared side walls providing for channel-like grooves 37.

Figure 9:
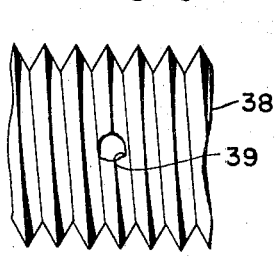

In FIGURE 9 the part 38 is shown as provided with three parallel channel-like grooves 39.

Figure 10:
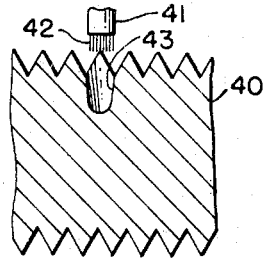
FIGURE 10 is a fragmentary sectional view illustrating the relationship between a laser and a recess in a threaded part formed thereby.
Figure 11:
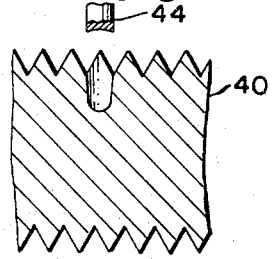
FIGURE 11 is a fragmentary view of the tapered laser-formed recess showing the approach of a shearing tool thereto.
Figure 12:
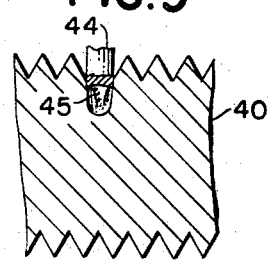
FIGURES 12 and 13 are sectional views similar to FIGURE 11, showing the shearing tool in different positions during its operating stroke.
Figure 13:
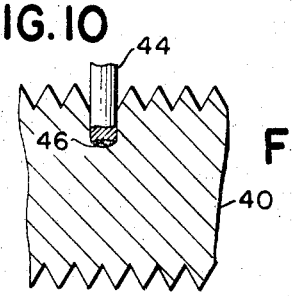

The use of the shearing operation to remove material from the side walls of an initially formed recess permits the formation of the initial recess by the use of a laser beam of controlled intensity and for a controlled duration. In FIGURE 10 the threaded part 40 is shown in association with a laser, the latter being diagrammatically indicated at 41 and adapted to project a beam 42 of controlled intensity and for a controlled duration sufficient to produce the recess 43. It is a characteristic of recesses formed by the operation of a laser that the side wall of the recess has a slight inward taper as illustrated in FIGURE 10. This of course makes the laser-formed recess particularly poorly adapted to receive a friction plug since the plug depends for friction with the side walls of the recess to retain it in place. However, the shearing operation illustrated in FIGURES 11–13 permits the removal of the bulk of material by the laser and final shaping of the recess to uniform cross-section by inward movement of a shearing tool or punch indicated at 44. Again, the end of the punch may be shaped square across or it may be slightly concave to provide an acute angular continuous shaped edge. In any case, the punch is moved downwardly from the position illustrated in FIGURE 11 through the intermediate position shown in FIGURE 12 to the final position shown in FIGURE 13. In FIGURE 12 it will be noted that the shearing action is producing chips 45 and that these chips, while they remain attached to the unsheared side wall of the laser-formed recess 43, are mechanically projected downwardly by engagement with the end surfaces of the punch. When the punch reaches its innermost position illustrated in FIGURE 14, the chips which have been formed during the shearing operation are compacted in the bottom of the sheared recess as indicated at 46. Preferably, these chips remain attached to the material of the part 40. As previously described, the presence of these chips in the bottom of the recess do not in any way interfere with the insertion of the plastic element under pressure and in fact, may operate to assist to retain the plastic element in the recess.

The drawing and the foregoing specification constitute a description of the improved method of forming recesses in parts for the reception of friction locking plugs in such full, clear, concise and exact terms as to enable any person skilled in the art to practice the invention, the scope of which is indicated by the appended claims.

What I claim as my invention is:

1. The method of forming recesses in parts for the reception of friction locking elements which comprises forming a recess of the approximate desired size and shape in a previously threaded part, shearing material from the side wall of the recess inwardly from the outer end of the recess to form sheared side wall portions in the recess which are composed entirely of straight line elements parallel to the axis of the recess.

2. The method of claim 1 which comprises forming the original recess by drilling, leaving burrs at the intersection of the side of the recess and the threaded surface of the part, the shearing step comprising shearing to a slightly larger minimum cross-section so as to remove the burrs formed in drilling.

3. The method of claim 2 which comprises shearing the recess to circular cross-section.

4. The method of claim 2 which comprises shearing the recess to non-circular cross-section.

5. The method of claim 1 which comprises compacting the sheared chips in the bottom of the recess.

6. The method of claim 5 which comprises the step of terminating the shearing action with the sheared chips still attached to the material of the part at the bottom of the recess.

7. The method of claim 1 which comprises initially forming the recess in the threaded part by laser beam, producing a recess which is slightly inwardly tapered, the shearing step eliminating the inward taper.

8. The method of claim 7 which comprises compacting the sheared chips in the bottom of the recess.

9. The method of claim 7 which comprises the step of terminating the shearing action with the sheared chips still attached to the material of the part at the bottom of the recess.

References Cited

UNITED STATES PATENTS

| | | | |
|---|---|---|---|
| 1,549,309 | 8/1925 | Howe et al. | 29—558 X |
| 2,520,121 | 8/1950 | Bratus | 29—451 X |
| 2,663,344 | 12/1953 | Burdick | 10—10 X |
| 3,313,016 | 4/1967 | Seulen et al. | 29—558 X |

THOMAS H. EAGER, *Primary Examiner.*